US007000234B1

(12) United States Patent
Shavit et al.

(10) Patent No.: US 7,000,234 B1
(45) Date of Patent: Feb. 14, 2006

(54) MAINTAINING A DOUBLE-ENDED QUEUE AS A LINKED-LIST WITH SENTINEL NODES AND DELETE FLAGS WITH CONCURRENT NON-BLOCKING INSERT AND REMOVE OPERATIONS USING A DOUBLE COMPARE-AND-SWAP PRIMITIVE

(75) Inventors: Nir N. Shavit, Cambridge, MA (US); Paul A. Martin, Arlington, MA (US); Guy L. Steele, Jr., Lexington, MA (US)

(73) Assignee: Sun Microsystems, Inc., Sunnyvale, CA (US)

( * ) Notice: Subject to any disclaimer, the term of this patent is extended or adjusted under 35 U.S.C. 154(b) by 0 days.

(21) Appl. No.: 09/547,290

(22) Filed: Apr. 11, 2000

Related U.S. Application Data

(60) Provisional application No. 60/177,090, filed on Jan. 20, 2000.

(51) Int. Cl.
*G06F 9/54* (2006.01)

(52) U.S. Cl. ....................... 719/315; 719/313; 719/314

(58) Field of Classification Search ........ 719/310–315, 719/400

See application file for complete search history.

(56) References Cited

U.S. PATENT DOCUMENTS

| | | | | |
|---|---|---|---|---|
| 3,686,641 | A | 8/1972 | Logan et al. | |
| 3,886,525 | A | 5/1975 | Brown et al. | |
| 4,847,754 | A * | 7/1989 | Obermarck et al. | 718/104 |
| 5,222,238 | A * | 6/1993 | Zobre et al. | 710/240 |
| 5,797,005 | A | 8/1998 | Bahls et al. | |
| 6,247,064 | B1 | 6/2001 | Alferness et al. | |
| 6,360,219 | B1 | 3/2002 | Bretl et al. | |
| 6,374,339 | B1 | 4/2002 | Iivonen | |

FOREIGN PATENT DOCUMENTS

| | | | |
|---|---|---|---|
| EP | 0 366 585 | A | 5/1990 |
| EP | 0 466 339 | A2 | 1/1992 |
| WO | WO 86 00434 | A | 1/1986 |

OTHER PUBLICATIONS

Blumofe, Robert D. et al. "Verification of a Concurrent Deque Implementation." Jun. 1999.*

Shann, Chien-Hua et al. "A practicial nonblocking queue algorithm using compare-and-swap". IEEE. Jul., 2000.*

(Continued)

*Primary Examiner*—Lewis A. Bullock, Jr.
(74) *Attorney, Agent, or Firm*—Zagorin O'Brien Graham

(57) ABSTRACT

A linked-list-based concurrent shared object implementation has been developed that provides non-blocking and linearizable access to the concurrent shared object. In an application of the underlying techniques to a deque, the linked-list-based algorithm allows non-blocking completion of access operations without restricting concurrency in accessing the deque's two ends. The new implementation is based at least in part on a new technique for splitting a pop operation into two steps, marking that a node is about to be deleted, and then deleting it. Once marked, the node logically deleted, and the actual deletion from the list can be deferred. In one realization, actual deletion is performed as part of a next push or pop operation performed at the corresponding end of the deque. An important aspect of the overall technique is synchronization of delete operations when processors detect that there are only marked nodes in the list and attempt to delete one or more of these nodes concurrently from both ends of the deque.

23 Claims, 10 Drawing Sheets

OTHER PUBLICATIONS

Prakash, Sundeep et al. "A Nonblocking Algorithm for Shared Queues Using Compare-and-swap." IEEE. May 1994.*

Michael, Maged et al. "Simple, Fast, and Practical Non-Blocking and Blocking Concurrent Queue Algorithms." ACM. 1996.*

Prakesh, Sundeep et al. "Non-Blocking Algorithms for Concurrent Date Structures." Jul. 1, 1991.*

Valois, John D. "Lock-Free Linked Lists Using Compare-and-Swap." ACM. 1995.*

Turek, John et al. "Locking without Blocking: Making Lock Based Concurrent Data Structure Algorithms Nonblocking." ACM. 1992.*

Farook, Mahammad et al. "Managing Long Linked Lists Using Lock Free Techniques." University of manitoba, Canada.*

IBM Technical Disclosure Bulletin. "Conditional Multiple Store Instruction." Feb. 1, 1980.*

Stone, Janice M. "A simple and correct shared-queue algorithm using Compare-and-Swap." IEEE. 1990.*

U.S. Appl. No. 09/551,113, entitled Concurrent Shared Object Implemented Using a Linked List with Amortized Node Allocation, filed Apr. 18, 2000, by inventors(s) Paul A. Martin, David L. Detlefs, Alexander T. Garthwaite, and Guy L. Steele Jr.

U.S. Appl. No. 09/551,311, entitled Shared Object Implemented Using a Linked-List Technique that Tolerates Certain Concurrent Opposing-End Removals Using a Distinguishing Pointer Value, filed Apr. 18, 2000, by inventor(s) Guy L. Steele Jr., Alexander T. Garthwaite, Paul A. Martin, and Nir N. Shavit.

U.S. Appl. No. 09/547,288, entitled Maintaining a Double-Ended Queue in a Contiguous Array with Concurrent Non-Blocking Insert and Remove Operations Using a Double Compare-and-Swap Primitive, filed Apr. 11, 2000, by inventor(s) Nir N. Shavit, Ole Agesen, David L. Detlefs, Christine H. Flood, Alexander T. Garthwaite, Paul A. Martin, and Guy L. Steele, Jr.

Y. Afek, M. Merritt, G. Taubenfeld, and D. Touitou. "Disentangling Multi-Object Operations," *Proceedings of the 16th Annual ACM Symposium on Principles of Distributed Computing*, pp. 111-120, Aug. 1997. Santa Barbara, CA.

N. S. Arora, Blumofe, and C. G. Plaxton. "Thread Scheduling For Multiprogrammed Multiprocessors," *Proceedings of the 10th Annual ACM Symposium on Parallel Algorithms and Architectures*, 1998.

H. Attiya and E. Dagan. "Universal Operations: Unary versus Binary," *Proceedings of the 15th Annual ACM Symposium on Principles of Distributed Computing*, 11 pages, May 23-26, 1996. Phila. PA.

Hagit Attiya, Nancy Lynch, and Nir Shavit. "Are Wait-Free Algorithms Fast?" *Journal of the ACM*, 41(4):725-763, pp. 223-232, Jul. 1994.

Hagit Attiya and Ophir Rachman. "Atomic Snapshots In O(n log n) Operations," *SIAM Journal on Computing*, 27(2):319-340, pp. 1-42, Mar. 1998.

G. Barnes. "A Method For Implementing Lock-Free Shared Data Structures," *Proceedings of the 5th ACM Symposium on Parallel Algorithms and Architectures*, pp. 261-270, Jun. 1993.

B.N. Bershad. "Practical Considerations For Non-Blocking Concurrent Objects," *Proceedings 13th IEEE International Conference on Distributed Computing Systems*, pp. 264-273. IEEE Computer Society Press, May 25-28, 1993. Los Alamitos CA.

M. Greenwald. "Non-Blocking Synchronization and System Design," PhD thesis, Stanford University Technical Report STAN-CS-TR-99-1624, 241 pages, Palo Alto, CA, 8 1999.

M. B. Greenwald and D. R. Cheriton. "The Synergy Between Non-Blocking Synchronization And Operating System Structure," *2nd Symposium on Operating Systems Design and Implementation*, pp. 123-136, Oct. 28-31, 1996. Seattle, WA.

M. Herlihy. "A Methodology For Implementing Highly Concurrent Data Objects," *ACM Transactions on Programming Languages and Systems*, 15(5):745-770, Nov. 1993.

M. Herlihy and J. Moss. "Transactional memory: Architectural Support For Lock-Free Data Structures," *Technical Report CRL 92/07*, Digital Equipment Corporation, 12 pages, Cambridge Reseach Lab, 1992.

M.P. Herlihy. "Wait-Free Synchronization," *ACM Transactions On Programming Languages and Systems*, 13(1):124-149, Jan. 1991.

M.P. Herlihy and J.M. Wing. "Linearizability: A Correctness Condition For Con-Current Objects," *ACM Transactions On Programming Languages and Systems*, 12(3):463-492, Jul. 1990.

D. E. Knuth. "The Art of Computer Programming: Fundamental Algorithms," Addison-Wesley, 2nd edtition, 3 pages, 1968.

A. LaMarca. "A performance evaluatio of lock-free synchronization protocols," *Proceedings of the 13th Annual ACM Symposium on Principles of Distributed Computing*, pp. 130-140, Aug. 14-17, 1994. Los Angeles, CA.

H. Massalin and C. Pu. "A Lock-Free Multiprocessor OS Kernel," *Technical Report TR CUCS-005-9*, pp. 1-19, Columbia University, New York, NY, 1991.

N. Shavit and Touitou. "Software Transactional Memory," *Distriubted Computing*, 10(2):99-116, Feb. 1997.

U.S. Appl. No. 09/207,940, entitled Platform Independent Double Compare and Swap Operation, filed Dec. 9, 1998, by inventor(s) Robert Cartwright Jr. and Ole Agesen.

Henry Massalin, "Synthesis: An Efficient Implementation of Fundamental Operating System Services," Dissertation submitted in partial fulfillment of the requirements for the Degree of Doctor of Philosophy in the Graduate School of Arts and Sciences, Columbia Unversity, New York, NY, online, 1992; pp. 1-149 XP002172093 [retrieved from the Internet on Jul. 13, 2001: URL:ftp://ftp.cs.columbia.edu/reports/reports-1992/cucs-039-92.ps.gz].

Weiss, Mark Allen, *Data Structures & Algorithm Analysis in C++*, Second Edition, Reading, Mass., Addison-Wesley, 1999, Chapter 3.

Comer, Douglas, *Operating System Design: The Xinu Approach*, Englewood Cliffs, New Jersey, Prentice-Hall, Inc., 1984, Chapter 3.

Patterson, David A. and Hennessy, John L., Computer Architecture: A Quantitative Approach, Second Edition, San Francisco, California, Morgan Kaufman Publishers, Inc., 1996, pp. 485-495 and 562-572.

Cohoon, James P. and Davidson, Jack W., *C++ Program Design: An Introduction to Programming and Object-*

*Oriented Design*, Second Edition, New York, New York, WCB/McGraw-Hill, 1999, pp. 465-502.
Stroustrup, Bjarne, The C++ Programming Language, Third Edition, Reading, Mass., Addison-Wesley, 1997, pp. 461-497.
Chuang, Tyng-Ruey et al., "Real-Time Deques, Multihead Turing Machines, and Purely Functional Programming", ACM, Jun. 1993.

* cited by examiner

EMPTY DEQUE

EMPTY DEQUE WITH A RIGHT-DELETED CELL

EMPTY DEQUE WITH A LEFT-DELETED CELL

EMPTY DEQUE WITH TWO DELETED CELLS

MAINTAINING A DOUBLE-ENDED QUEUE AS A LINKED-LIST WITH SENTINEL NODES AND DELETE FLAGS WITH CONCURRENT NON-BLOCKING INSERT AND REMOVE OPERATIONS USING A DOUBLE COMPARE-AND-SWAP PRIMITIVE

This application claims benefit of U.S. Provisional Application No. 60/177,090, filed Jan. 20, 2000, which is incorporated in its entirety herein by reference.

BACKGROUND OF THE INVENTION

1. Field of the Invention

The present invention relates to coordination amongst processors in a multiprocessor computer, and more particularly, to structures and techniques for facilitating non-blocking access to concurrent shared objects.

2. Description of the Related Art

Non-blocking algorithms can deliver significant performance benefits to parallel systems. However, there is a growing realization that existing synchronization operations on single memory locations, such as compare-and-swap (CAS), are not expressive enough to support design of efficient non-blocking algorithms. As a result, stronger synchronization operations are often desired: One candidate among such operations is a double-word compare-and-swap (DCAS). If DCAS operations become more generally supported in computers systems and, in some implementations, in hardware, a collection of efficient current data structure implementations based on the DCAS operation will be needed.

Massalin and Pu disclose a collection of DCAS-based concurrent algorithms. See e.g., H. Massalin and C. Pu, *A Lock-Free Multiprocessor OS Kernel*, Technical Report TR CUCS-005-9, Columbia University, New York, N.Y., 1991, pages 1–19. In particular, Massalin and Pu disclose a lock-free operating system kernel based on the DCAS operation offered by the Motorola 68040 processor, implementing structures such as stacks, FIFO-queues, and linked lists. Unfortunately, the disclosed algorithms are centralized in nature. In particular, the DCAS is used to control a memory location common to all operations, and therefore limits overall concurrency.

Greenwald discloses a collection of DCAS-based concurrent data structures that improve on those of Massalin and Pu. See e.g., M. Greenwald. *Non-Blocking Synchronization and System Design*, Ph.D. thesis, Stanford University Technical Report STAN-CS-TR-99-1624, Palo Alto, Calif., 8 1999, 241 pages. In particular, Greenwald discloses implementations of the DCAS operation in software and hardware and discloses two DCAS-based concurrent double-ended queue (deque) algorithms implemented using an array. Unfortunately, Greenwald's algorithms use DCAS in a restrictive way. The first, described in Greenwald, *Non-Blocking Synchronization and System Design,* at pages 196–197, used a two-word DCAS as if it were a three-word operation, storing two deque end pointers in the same memory word, and performing the DCAS operation on the two pointer word and a second word containing a value. Apart from the fact that Greenwald's algorithm limits applicability by cutting the index range to half a memory word, it also prevents concurrent access to the two ends of the deque. Greenwald's second algorithm, described in Greenwald, *Non-Blocking Synchronization and System Design*, at pages 217–220) assumes an array of unbounded size, and does not deal with classical array-based issues such as detection of when the deque is empty or full.

Arora et al. disclose a CAS-based deque with applications in job-stealing algorithms. See e.g., N. S. Arora, Blumofe, and C. G. Plaxton, *Thread Scheduling For Multiprogrammed Multiprocessors, in Proceedings of the* 10*th Annual ACM Symposium on Parallel Algorithms and Architectures,* 1998. Unfortunately, the disclosed non-blocking implementation restricts one end of the deque to access by only a single processor and restricts the other end to only pop operations.

Accordingly, improved techniques are desired that do not suffer from the above-described drawbacks of prior approaches.

SUMMARY

A set of structures and techniques are described herein whereby an exemplary concurrent shared object, namely a double-ended queue (deque), is provided. Although a described non-blocking, linearizable deque implementation exemplifies several advantages of realizations in accordance with the present invention, the present invention is not limited thereto. Indeed, based on the description herein and the claims that follow, persons of ordinary skill in the art will appreciate a variety of concurrent shared object implementations. For example, although the described deque implementation exemplifies support for concurrent push and pop operations at both ends thereof, other concurrent shared objects implementations in which concurrency requirements are less severe, such as LIFO or stack structures and FIFO or queue structures, may also be implemented using the techniques described herein.

Accordingly, a novel linked-list-based concurrent shared object implementation has been developed that provides non-blocking and linearizable access to the concurrent shared object. In an application of the underlying techniques to a deque, the linked-list-based algorithm allows non-blocking completion of access operations without restricting concurrency in accessing the deque's two ends. The new implementation is based at least in part on a new technique for splitting a pop operation into two steps, marking that a node is about to be deleted, and then deleting it. Once marked, the node is logically deleted, and the actual deletion from the list can be deferred. In one realization, actual deletion is performed as part of a next push or pop operation performed at the corresponding end of the deque. An important aspect of the overall technique is synchronization of delete operations when processors detect that there are only marked nodes in the list and attempt to delete one or more of these nodes concurrently from both ends of the deque.

A novel array-based concurrent shared object implementation has also been developed, which provides non-blocking and linearizable access to the concurrent shared object. In an application of the underlying techniques to a deque, the array-based algorithm allows uninterrupted concurrent access to both ends of the deque, while returning appropriate exceptions in the boundary cases when the deque is empty or full. An interesting characteristic of the concurrent deque implementation is that a processor can detect these boundary cases, e.g., determine whether the array is empty or full, without checking the relative locations of the two end pointers in an atomic operation.

Both the linked-list-based implementation and the array-based implementation provide a powerful concurrent shared object construct that, in realizations in accordance with the present invention, provide push and pop operations at both ends of a deque, wherein each execution of a push or pop operation is non-blocking with respect to any other. Significantly, this non-blocking feature is exhibited throughout a complete range of allowable deque states. For an array-based implementation, the range of allowable deque states includes full and empty states. For a linked-list-based implementation, the range of allowable deque states includes at least the empty state, although some implementations may support treatment of a generalized out-of-memory condition as a full state.

BRIEF DESCRIPTION OF THE DRAWINGS

The present invention may be better understood, and its numerous objects, features, and advantages made apparent to those skilled in the art by referencing the accompanying drawings.

FIGS. 5A, 5B and 5C also illustrate an artifact of the linear depiction of a circular buffer, namely that, through a series of preceding operations, ends of the deque may wrap around such that left and right indices may appear (in the linear depiction) to the right and left of each other.

FIGS. 7B, 7C and 7D depict valid empty states that may occur in a linked-list-based implementation of a deque after successful completion of a pop_left or pop_right operation, but before successful execution of an appropriate null node deletion operation.

FIGS. 9A and 9B illustrate a deque state before and after successful completion of a synchronization operation.

The use of the same reference symbols in different drawings indicates similar or identical items.

DESCRIPTION OF THE PREFERRED EMBODIMENT(S)

Figure 1A:
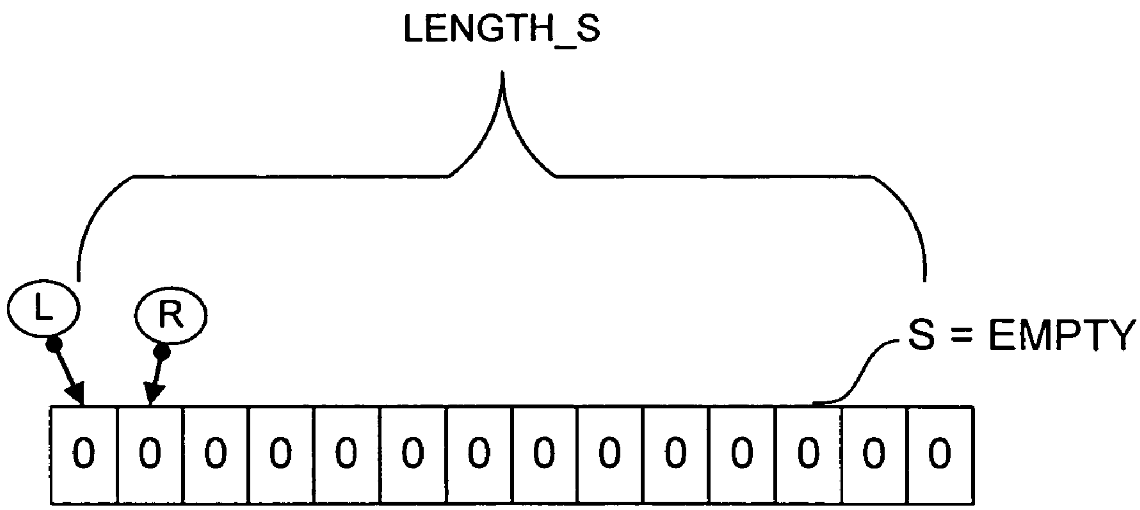
FIGS. 1A and 1B illustrate exemplary empty and full states of a double-ended queue (deque) implemented as an array in accordance with the present invention.

The description that follows presents a set of techniques, objects, functional sequences and data structures associated with concurrent shared object implementations employing double compare-and-swap (DCAS) operations in accordance with an exemplary embodiment of the present invention. An exemplary non-blocking, linearizable concurrent double-ended queue (deque) implementation is illustrative. A deque is a good exemplary concurrent shared object implementation, in that it involves all the intricacies of LIFO-stacks and FIFO-queues, with the added complexity of handling operations originating at both of the deque's ends. Accordingly, techniques, objects, functional sequences and data structures presented in the context of a concurrent deque implementation will be understood by persons of ordinary skill in the art to describe a superset of support and functionality suitable for less challenging concurrent shared object implementations, such as LIFO-stacks, FIFO-queues or concurrent shared objects (including deques) with simplified access semantics.

In view of the above, and without limitation, the description that follows focuses on an exemplary linearizable, non-blocking concurrent deque implementation which behaves as if access operations on the deque are executed in a mutually exclusive manner, despite the absence of a mutual exclusion mechanism. Advantageously, and unlike prior approaches, deque implementations in accordance with some embodiments of the present invention allow concurrent operations on the two ends of the deque to proceed independently.

Computational Model

One realization of the present invention is as a deque implementation, employing the DCAS operation, on a shared memory multiprocessor computer. This realization, as well as others, will be understood in the context of the following computation model, which specifies the concurrent semantics of the deque data structure.

In general, a concurrent system consists of a collection of n processors. Processors communicate through shared data structures called objects. Each object has an associated set of primitive operations that provide the mechanism for manipulating that object. Each processor P can be viewed in an abstract sense as a sequential thread of control that applies a sequence of operations to objects by issuing an invocation and receiving the associated response. A history is a sequence of invocations and responses of some system execution. Each history induces a "real-time" order of operations where an operation A precedes another operation B, if A's response occurs before B's invocation. Two operations are concurrent if they are unrelated by the real-time order. A sequential history is a history in which each invocation is followed immediately by its corresponding response. The sequential specification of an object is the set of legal sequential histories associated with it. The basic correctness requirement for a concurrent implementation is linearizability. Every concurrent history is "equivalent" to some legal sequential history which is consistent with the real-time order induced by the concurrent history. In a linearizable implementation, an operation appears to take effect atomically at some point between its invocation and response. In the model described herein, a shared memory location L of a multiprocessor computer's memory is a linearizable implementation of an object that provides each processor $P_i$ with the following set of sequentially specified machine operations:

$Read_i$ (L) reads location L and returns its value.

$Write_i$ (L, v) writes the value v to location L.

$DCAS_i$ (L1, L2, o1, o2, n1, n2) is a double compare-and-swap operation with the semantics described below.

Implementations described herein are non-blocking (also called lock-free). Let us use the term higher-level operations in referring to operations of the data type being implemented, and lower-level operations in referring to the (machine) operations in terms of which it is implemented. A non-blocking implementation is one in which even though individual higher-level operations may be delayed, the system as a whole continuously makes progress. More formally, a non-blocking implementation is one in which any history containing a higher-level operation that has an invocation but no response must also contain infinitely many responses concurrent with that operation. In other words, if some processor performing a higher-level operation continuously takes steps and does not complete, it must be because some operations invoked by other processors are continuously completing their responses. This definition guarantees that the system as a whole makes progress and that individual processors cannot be blocked, only delayed by other processors continuously taking steps. Using locks would violate the above condition, hence the alternate name: lock-free.

Double-word Compare-and-Swap Operation

Double-word compare-and-swap (DCAS) operations are well known in the art and have been implemented in hardware, such as in the Motorola 68040 processor, as well as through software emulation. Accordingly, a variety of suitable implementations exist and the descriptive code that follows is meant to facilitate later description of concurrent shared object implementations in accordance with the present invention and not to limit the set of suitable DCAS implementations. For example, order of operations is merely illustrative and any implementation with substantially equivalent semantics is also suitable. Furthermore, although exemplary code that follows includes overloaded variants of the DCAS operation and facilitates efficient implementations of the later described push and pop operations, other implementations, including single variant implementations may also be suitable.

```
boolean DCAS(val *addr1, val *addr2,
        val old1, val old2,
        val new1, val new2) {
    atomically {
        if ((*addr1==old1) && (*addr2==old2)) {
            *addr1 = new1;
            *addr2 = new2;
            return true;
        } else {
            return false;
        }
    }
}
boolean DCAS(val *addr1, val *addr2,
        val old1, val old2,
        val *new1, val *new2) {
    atomically {
```

-continued

```
        temp1 = *addr1;
        temp2 = *addr2;
        if ((temp1 == old1) && (temp2 == old2)) {
            *addr1 = *new1;
            *addr2 = *new2;
            *new1 = temp1;
            *new2 = temp2;
            return true;
        } else {
            *new1 = temp1;
            *new2 = temp2;
            return false;
        }
    }
}
```

Note that in the exemplary code, the DCAS operation is overloaded, i.e., if the last two arguments of the DCAS operation (new1 and new2) are pointers, then the second execution sequence (above) is operative and the original contents of the tested locations are stored into the locations identified by the pointers. In this way, certain invocations of the DCAS operation may return more information than a success/failure flag.

The above sequences of operations implementing the DCAS operation are executed atomically using support suitable to the particular realization. For example, in various realizations, through hardware support (e.g., as implemented by the Motorola 68040 microprocessor or as described in M. Herlihy and J. Moss, *Transactional memory: Architectural Support For Lock-Free Data Structures*, Technical Report CRL 92/07, Digital Equipment Corporation, Cambridge Research Lab, 1992, 12 pages), through non-blocking software emulation (such as described in G. Barnes, *A Method For Implementing Lock-Free Shared Data Structures*, in *Proceedings of the 5th ACM Symposium on Parallel Algorithms and Architectures*, pages 261–270, June 1993 or in N. Shavit and D. Touitou, *Software transactional memory, Distributed Computing,* 10(2):99–116, February 1997), or via a blocking software emulation (such as described in U.S. patent application Ser. No. 09/207,904, U.S. Pat. No. 6,223,335, entitled "PLATFORM INDEPENDENT DOUBLE COMPARE AND SWAP OPERATION," naming Cartwright and Agesen as inventors, and filed Dec. 9, 1998).

Although the above-referenced implementations are presently preferred, other DCAS implementations that substantially preserve the semantics of the descriptive code (above) are also suitable. Furthermore, although much of the description herein is focused on double-word compare-and-swap (DCAS) operations, it will be understood that N-location compare-and-swap operations ($N \geqq 2$) may be more generally employed, though often at some increased overhead.

A Double-ended Queue (Deque)

A deque object S is a concurrent shared object, that in an exemplary realization is created by an operation of a constructor operation, e.g., make_deque (length_s), and which allows each processor $P_i$, $0 \leqq i \leqq n-1$, of a concurrent system to perform the following types of operations on S: $push\_right_i(v)$, $push\_left_i(v)$, pop $right_i(\,)$, and $pop\_left_i(\,)$. Each push operation has an input, v, where v is selected from a range of values. Each pop operation returns an output from the range of values. Push operations on a full deque object and pop operations on an empty deque object return appropriate indications.

A concurrent implementation of a deque object is one that is linearizable to a standard sequential deque. This sequential deque can be specified using a state-machine representation that captures all of its allowable sequential histories. These sequential histories include all sequences of push and pop operations induced by the state machine representation, but do not include the actual states of the machine. In the following description, we abuse notation slightly for the sake of clarity.

The state of a deque is a sequence of items $S=\langle v_0, \ldots, v_k \rangle$ from the range of values, having cardinality $0 \leqq |s| \leqq$ length_S. The deque is initially in the empty state (following invocation of make_deque (length_S)), that is, has cardinality 0, and is said to have reached a full state if its cardinality is length_S.

The four possible push and pop operations, executed sequentially, induce the following state transitions of the sequence $S=\langle v_0, \ldots, v_k \rangle$, with appropriate returned values:

push_right ($v_{new}$) if S is not full, sets S to be the sequence $S=\langle v_0, \ldots, v_k, v_{new} \rangle$ push_left ($v_{new}$) if S is not full, sets S to be the sequence $S=\langle V_{new}, V_0, \ldots, V_k \rangle$ pop_right ( ) if S is not empty, sets S to be the sequence $S=\langle v_0, \ldots, v_k \rangle$ pop_left ( ) if S is not empty, sets S to be the sequence $S=\langle v_1, \ldots, v_k \rangle$ For example, starting with an empty deque state, $S=\langle \rangle$, the following sequence of operations and corresponding transitions can occur. A push_right(1) changes the deque state to $S=\langle 1 \rangle$. A push_left (2) subsequently changes the deque state to $S=\langle 2,1 \rangle$. A subsequent push_right (3) changes the deque state to $S=\langle 2,1,3 \rangle$. Finally, a subsequent pop_right changes the deque state to $S=\langle 2,1 \rangle$.

An Array-Based Implementation

The description that follows presents an exemplary non-blocking implementation of a deque based on an underlying contiguous array data structure wherein access operations (illustratively, push_left, pop_left, push_right and pop_right) employ DCAS operations to facilitate concurrent access. Exemplary code and illustrative drawings will provide persons of ordinary skill in the art with detailed understanding of one particular realization of the present invention; however, as will be apparent from the description herein and the breadth of the claims that follow, the invention is not limited thereto. Exemplary right-hand-side code is described in substantial detail with the understanding that left-hand-side operations are symmetric. Use herein of directional signals (e.g., left and right) will be understood by persons of ordinary skill in the art to be somewhat arbitrary. Accordingly, many other notational conventions, such as top and bottom, first-end and second-end, etc., and implementations denominated therein are also suitable.

Figure 1B:
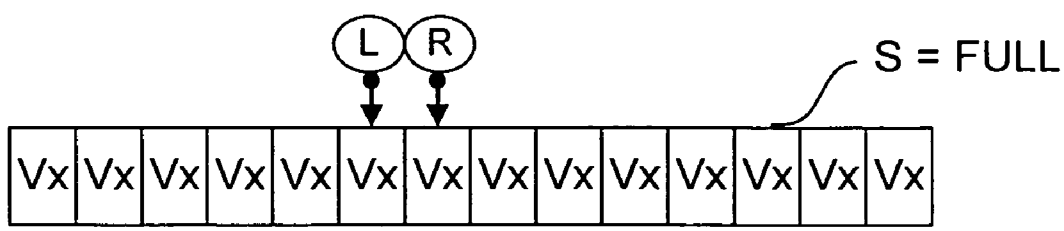

With the foregoing in mind, an exemplary non-blocking implementation of a deque based on an underlying contiguous array data structure is illustrated with reference to FIGS. 1A and 1B. In general, an array-based deque implementation includes a contiguous array S [0 . . . length_S−1] of storage locations indexed by two counters, R and L. The array, as well as the counters (or alternatively, pointers or indices), are typically stored in memory. Typically, the array S and indices R and L are stored in a same memory, although more generally, all that is required is that a particular DCAS implementation span the particular storage locations of the array and an index.

In operations on S, we assume that mod is the modulus operation over the integers (e.g., −1 mod 6=5, −2 mod 6=4, and so on). Henceforth, in the description that follows, we assume that all values of R and L are modulo length S, which implies that the array S is viewed as being circular. The array S[0 . . . length_S−1] can be viewed as if it were laid out with indexes increasing from left to right. We assume a distinguishing value, e.g., "null" (denoted as 0 in the drawings), not occurring in the range of real data values for S. Of course, other distinguishing values are also suitable.

Operations on S proceed as follows. Initially, for empty deque state, L points immediately to the left of R. In the illustrative embodiment, indices L and R always point to the next location into which a value can be inserted. If there is a null value stored in the element of S immediately to the right of that identified by L (or respectively, in the element of S immediately to the left of that identified by R), then the deque is in the empty state. Similarly, if there is a non-null value in the element of S identified by L (respectively, in the element of S identified by R), then the deque is in the full state. FIG. 1A depicts an empty state and FIG. 1B depicts a full state. During the execution of access operations in accordance with the present invention, the use of a DCAS guarantees that on any location in the array, at most one processor can succeed in modifying the entry at that location from a "null" to a "non-null" value or vice versa.

An illustrative pop_right access operation in accordance with the present invention follows:

```
val pop_right {
    while (true) {
        oldR = R;
        newR = (oldR − 1) mod length_S;
        oldS = S[newR];
        if (oldS == "null") {
            if (oldR == R)
                if (DCAS(&R, &S[newR],
                        oldR, oldS, oldR, oldS))
                    return "empty";
        }
        else {
            newS = "null";
            if (DCAS(&R, &S[newR],
                    oldR, oldS, &newR, &newS))
                return newS;
            else if (newR == oldR) {
                if (newS == "null") return "empty";
            }
        }
    }
}
```

To perform a pop_right, a processor first reads R and the location in S corresponding to R-1 (Lines 3–5, above). It then checks whether S [R-1] is null. As noted above, S[R-1] is short hand for S[R-1 mod length_S]. If S [R-1] is null, then the processor reads R again to see if it has changed (Lines 6–7). This additional read is a performance enhancement added under the assumption that the common case is that a null value is read because another processor "stole" the item, and not because the queue is really empty. Other implementations need not employ such an enhancement. The test can be stated as follows: if R hasn't changed and S [R-1] is null, then the deque must be empty since the location to the left of R always contains a value unless there are no items in the deque. However, the conclusion that the deque is empty can only be made based on an instantaneous view of R and S [R-1]. Therefore, the pop_right implementation employs a DCAS (Lines 8–10) to check if this is in fact the case. If so, pop_right returns an indication that the deque is empty. If not, then either the value in S [R-1] is no longer null or the index R has changed. In either case, the processor loops around and starts again, since there might now be an item to pop.

If S [R-11 is not null, the processor attempts to pop that item (Lines 12–20). The pop_right implementation employs a DCAS to try to atomically decrement the counter R and place a null value in S [R-1], while returning (via &newR and &newS) the old value in S [R-1] and the old value of the counter R (Lines 13–15). Note that the overloaded variant of DCAS described above is utilized here.

Figure 2:
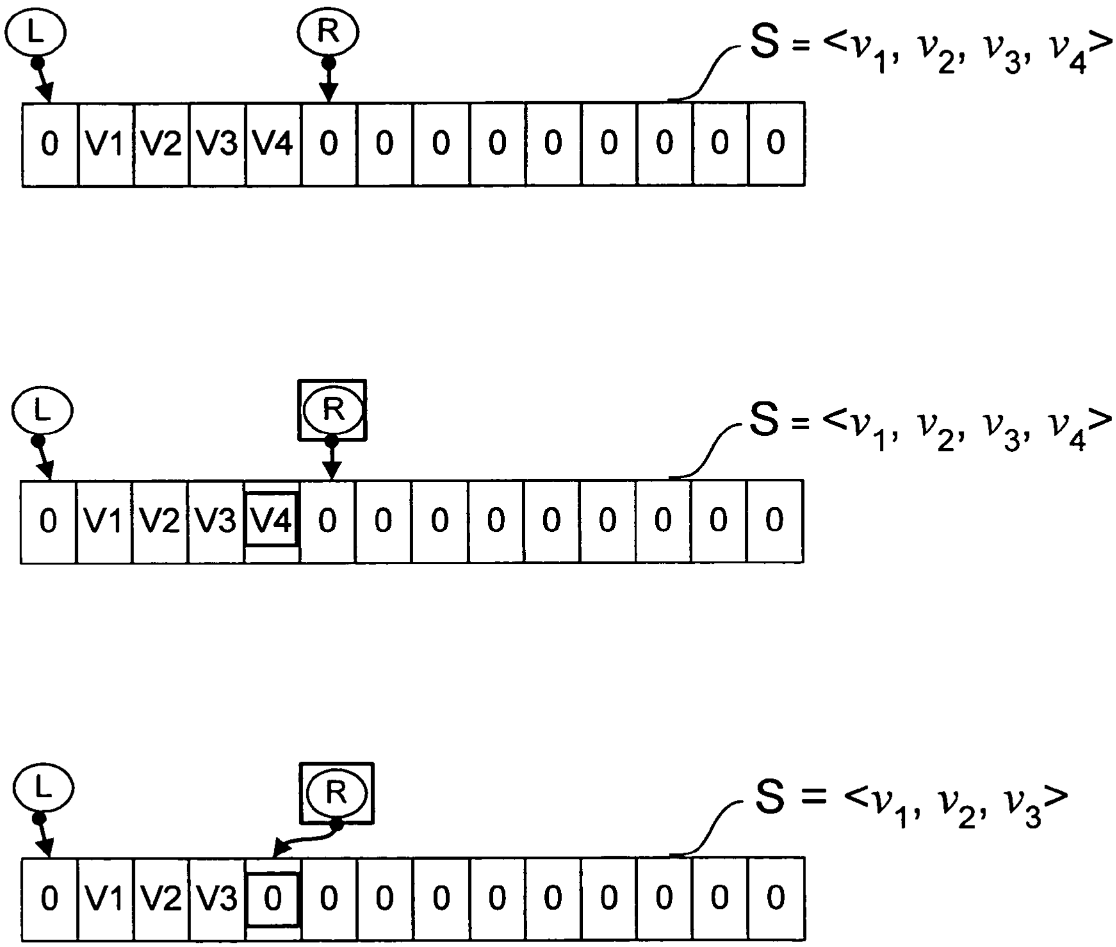
FIG. 2 illustrates successful operation of a pop_right operation on a partially full state of a deque implemented as an array in accordance with the present invention.

A successful DCAS (and hence a successful pop_right operation) is depicted in FIG. 2. Initially, $S=\langle v_1, v_2, v_3, v_4\rangle$ and L and R are as shown. Contents of R and of S [R-1] are read, but the results of the reads may not be consistent if an intervening competing access has successfully completed. In the context of the deque state illustrated in FIG. 2, the competing accesses of concern are a pop_right or a push_right, although in the case of an almost empty state of the deque, a pop_left might also intervene. Because of the risk of a successfully completed competing access, the pop_right implementation employs a DCAS (lines 14–15) to check the instantaneous values of R and of S [R–1] and, if unchanged, perform the atomic update of R and of S [R-1] resulting in a deque state of $S=\langle v_1, v_2, v_3\rangle$.

Figure 4:
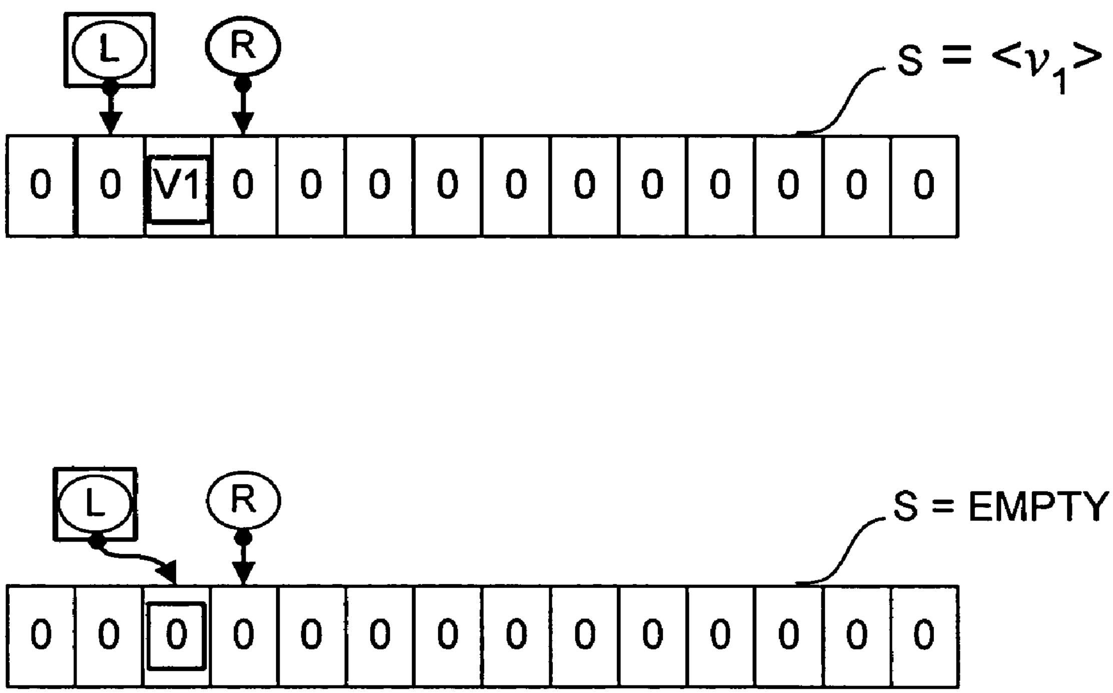
FIG. 4 illustrates contention between opposing pop_left and pop_right operations for a single remaining element in an almost empty state of a deque implemented as an array in accordance with the present invention.

If the DCAS is successful (as indicated in FIG. 2), the pop_right returns the value $v_4$ from S(R-1]. If it fails, pop_right checks the reason for the failure. If the reason for the DCAS failure was that R changed, then the processor retries (by repeating the loop) since there may be items still left in the deque. If R has not changed (Line 17), then the DCAS must have failed because S [R-1] changed. If it changed to null (Line 18), then the deque is empty. An empty deque may be the result of a competing pop_left that "steals" the last item from the pop_right, as illustrated in FIG. 4.

If, on the other hand, S [R-1] was not null, the DCAS failure indicates that the value of S [R-1] has changed, and some other processor(s) must have completed a pop and a push between the read and the DCAS operation. In this case, pop_right loops back and retries, since there may still be items in the deque. Note that Lines 17–18 are an optimization, and one can instead loop back if the DCAS fails. The optimization allows detection of a possible empty state without going through the loop, which in case the queue was indeed empty, would require another DCAS operation (Lines 6–10).

To perform a push_right, a sequence similar to pop_right is performed. An illustrative push_right access operation in accordance with the present invention follows:

```
val push_right (val v) {
    while (true) {
        oldR = R;
        newR = (oldR + 1) mod length_S;
        oldS = S[oldR];
        if (oldS != "null") {
            if (oldR == R)
                if (DCAS(&R, &S[oldR],
                        oldR, oldS, oldR, oldS))
                    return "full";
        }
        else {
            newS = v;
            if DCAS(&R, &S[oldR],
                        oldR, oldS, &newR, &newS)
```

-continued

```
                return "okay";
            else if (newR == oldR)
                return "full";
        }
    }
}
```

Operation of pop_right is similar to that of push_right, but with all tests to see if a location is null replaced with tests to see if it is non-null, and with S locations corresponding to an index identified by, rather than adjacent to that identified by, the index. To perform a push_right, a processor first reads R and the location in S corresponding to R (Lines 3–5, above). It then checks whether S [R] is non-null. If S [R] is non-null, then the processor reads R again to see if it has changed (Lines 6–7). This additional read is a performance enhancement added under the assumption that the common case is that a non-null value is read because another processor "beat" the processor, and not because the queue is really full. Other implementations need not employ such an enhancement. The test can be stated as follows: if R hasn't changed and S [R] is non-null, then the deque must be full since the location identified by R always contains a null value unless the deque is full. However, the conclusion that the deque is full can only be made based on an instantaneous view of R and S [R]. Therefore, the push_right implementation employs a DCAS (Lines 8–10) to check if this is in fact the case. If so, push_right returns an indication that the deque is full. If not, then either the value in S [R] is no longer non-null or the index R has changed. In either case, the processor loops around and starts again.

If S [R] is null, the processor attempts to push value, v, onto S (Lines 12–19). The push_right implementation employs a DCAS to try to atomically increment the counter R and place the value, v, in S [R], while returning (via &newR) the old value of index R (Lines 14–16). Note that the overloaded variant of DCAS described above is utilized here.

Figure 3:
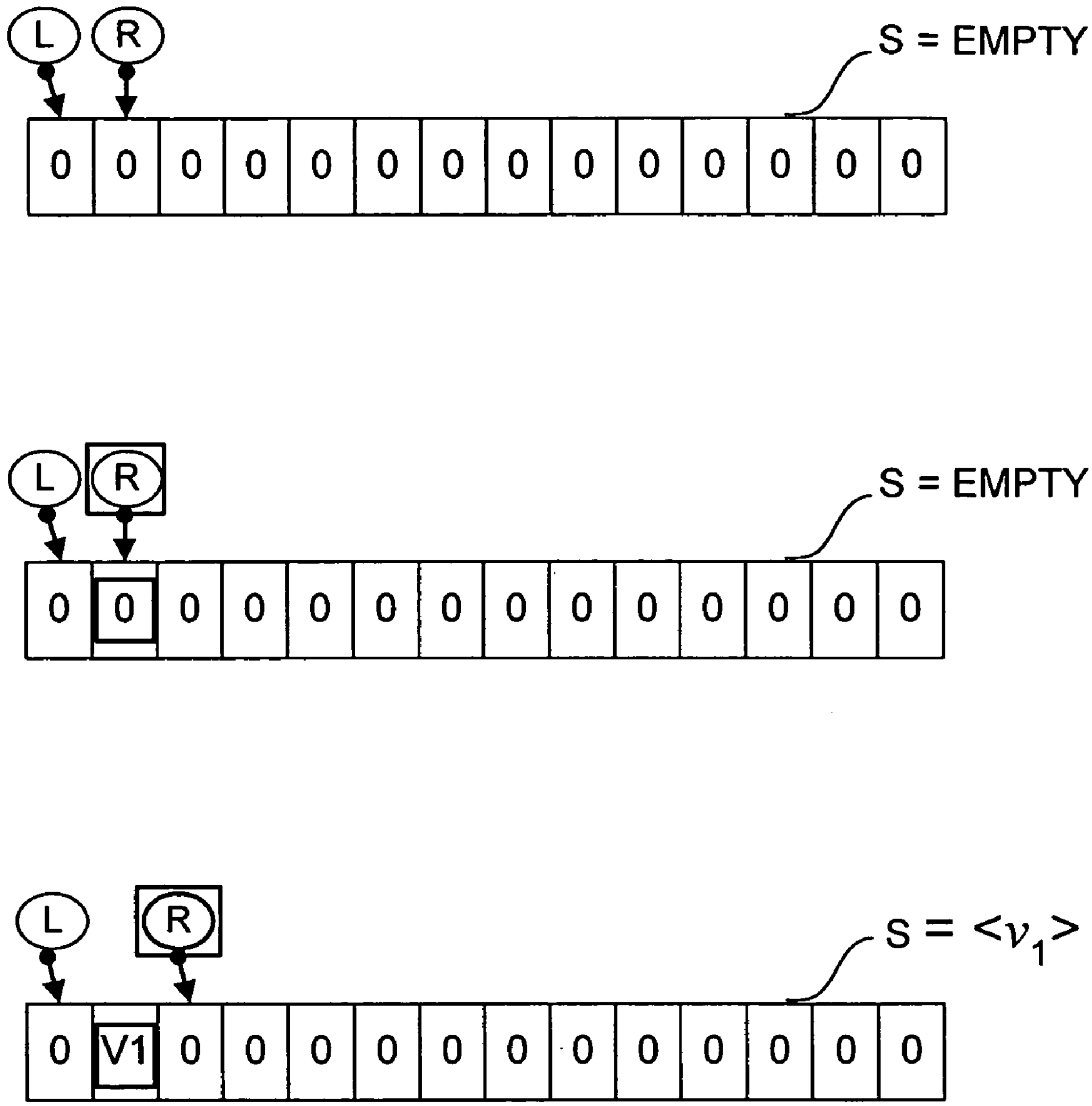
FIG. 3 illustrates successful operation of a push_right operation on a empty state of a deque implemented as an array in accordance with the present invention.

A successful DCAS and hence a successful push_right operation into an empty deque is depicted in FIG. 3. Initially, $S=\langle\rangle$ and L and R are as shown. Contents of R and of S [R] are read, but the results of the reads may not be consistent if an intervening competing access has successfully completed. In the context of the empty deque state illustrated in FIG. 3, the competing access of concern is another push_right, although in the case of non-empty state of the deque, a pop_right might also intervene. Because of the risk of a successfully completed competing access, the push_right implementation employs a DCAS (lines 14–15) to check the instantaneous values of R and of S [R] and, if unchanged, perform the atomic update of R and of S [R] resulting in a deque state of $S=\langle v_1\rangle$. A successful push_right operation into an almost-full deque is illustrated in the transition from deque states of FIGS. 5B and 5C.

In the final stage of the push_right code, in case the DCAS failed, there is a check using the value returned (via &newR) to see if the R index has changed. If it has not, then the failure must be due to a non-null value in the corresponding element of S, which means that the deque is full.

Pop_left and push_left sequences correspond to their above described right hand variants. An illustrative pop_left access operation in accordance with the present invention follows:

```
val pop_left {
    while (true) {
        oldL = L;
        newL = (oldL + 1) mod length_S;
        oldS = S[newL];
        if (oldS == "null") {
            if (oldL == L)
                if (DCAS(&L, &S[newL],
                                oldL, oldS, oldL, oldS))
                    return "empty";
        }
        else {
            newS = "null";
            if (DCAS(&L, &S[newL],
                            oldL, oldS, &newL, &newS))
                return newS;
            else if (newL == oldL) {
                if (newS == "null") return "empty";
            }
        }
    }
}
```

An illustrative push_left access operation in accordance with the present invention follows:

```
val push_left(val v) {
    while (true) {
        oldL = L;
        newL = (oldL - 1) mod length_S;
        oldS = S[oldL];
        if (oldS != "null") {
            if (oldL == L)
                if (DCAS(&L, &S[oldL],
                                oldL, oldS, oldL, oldS))
                    return "full" ;
        }
        else {
            newS = v;
            if (DCAS(&L, &S[oldL],
                            oldL, oldS, &newL, &newS))
                return "okay";
            else if (newL == oldL)
                return "full";
        }
    }
}
```

Figure 5A:
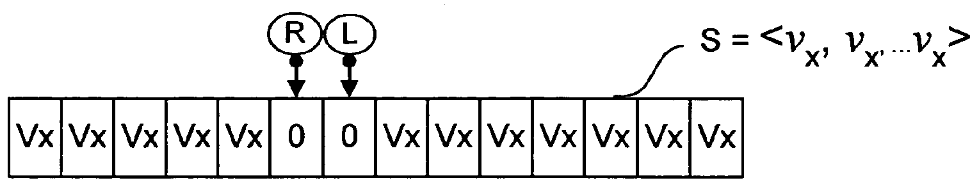
FIGS. 5A, 5B and 5C illustrate the results of a sequence of push_left and push_right operations on a nearly full state of a deque implemented as an array in accordance with the present invention. Following successful completion of the push_right operation, the deque is in a full state.
Figure 5B:
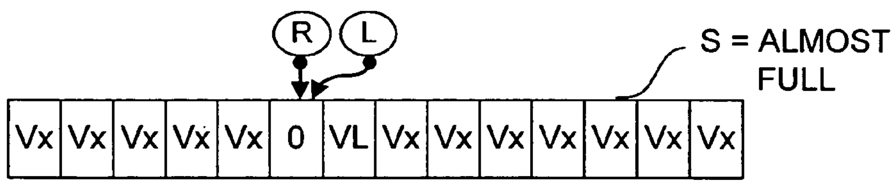
Figure 5C:
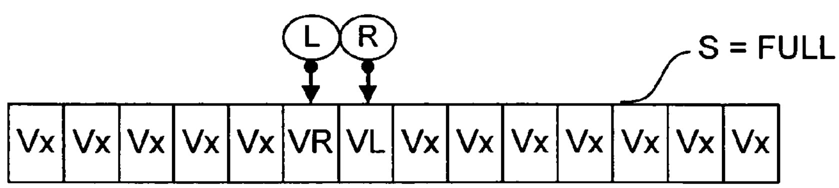

FIGS. 5A, 5B and 5C illustrate operations on a nearly full deque including a push_left operation (FIG. 5B) and a push_right operation that result in a full state of the deque (FIG. 5C). Notice that L has wrapped around and is "to-the-right" of R, until the deque becomes full, in which case again L and R cross. This switching of the relative location of the L and R pointers is somewhat confusing and represents a limitation of the linear presentation in the drawings. However, in any case, it should be noted that each of the above described access operations (push_left, pop_left, push_right and pop_right) can determine the state of the deque, without regard to the relative locations of L and R, but rather by examining the relation of a given index (R or L) to the value in a corresponding element of S.

A Linked-List-Based Implementation

The previous description presents an array-based deque implementation appropriate for computing environments in which, or for which, the maximum size of the deque can be predicted in advance. In contrast, the linked-list-based implementation described below avoids fixed allocations and size limits by allowing dynamic allocation of storage for elements of a represented sequence.

Although a variety of linked-list-based concurrent shared object implementations are envisioned, a non-blocking implementation of a deque based on an underlying doubly-linked list is illustrative. In one such implementation, access operations (illustratively, push_left, pop_left, push_right and pop_right) as well as auxiliary delete operations (delete_left and delete_right) employ DCAS operations to facilitate non-blocking concurrent access to the deque. Exemplary code and illustrative drawings will provide persons of ordinary skill in the art with a detailed understanding of one particular realization of the present invention; however, as will be apparent from the description herein and the breadth of the claims that follow, the invention is not limited thereto.

Aspects of the deque implementation described herein will be understood by persons of ordinary skill in the art to provide a superset of structures and techniques which may also be employed in less complex concurrent shared object implementations, such as LIFO-stacks, FIFO-queues and concurrent shared objects (including deques) with simplified access semantics. Furthermore, although the description that follows emphasizes doubly-linked list implementations, persons of ordinary skill in the art will recognize that the techniques described may also be exploited in simplified form for concurrent shared objects based on a singly-linked list.

With the forgoing in mind, and without limitation, the description that follows focuses on an exemplary linearizable, non-blocking concurrent deque implementation based on an underlying doubly-linked list of nodes. Each node includes two link pointers and a value field as follows:

```
typedef node {
    pointer *L;
    pointer *R;
    val_or_null_or_SentL_or_SentR value;
}
```

It is assumed that there are three distinguishing values (called null, sentL, and sentR) that can be stored in the value field of a node, but which are never pushed onto the deque.

In an exemplary doubly-linked list implementation, two distinguishing nodes, called "sentinels," are employed. The left sentinel is at a known fixed address SL. The left sentinel's L pointer is not used and its value field contains the distinguishing value, sentL. Similarly, the right sentinel is at a known fixed address SR. The right sentinel's R pointer is also not used and its value field contains the distinguishing value, sentR. Although the sentinel node technique of identifying list ends is presently preferred, other techniques consistent with the concurrency control described herein may also be employed.

In general, a node can be removed from the list in response to invocation of a pop_right or pop_left operation in two separate, atomic steps. First, the node is "logically" deleted, e.g., by replacing its value with "null" and setting a deleted indication to signify the presence of a logically deleted node. Second, the node is "physically" deleted by modifying pointers so that the node is no longer in the doubly-linked chain of nodes and by resetting the deleted indication. In each case, a synchronization primitive, preferably a DCAS, can be employed to ensure proper synchronization with competing push, pop, and delete operations.

If a process that is removing a node is suspended between completion of the logical deletion step and the physical deletion step, then any other process can perform the physical deletion step or otherwise work around the fact that the second step has not yet been performed. In some realizations of a deque, the physical deletion is performed as part of a next same end push or pop operation. In other realizations, physical deletion may be performed as part of the initiating pop operation.

In one deque realization, deleted indications are stored in the sentinel node corresponding to the end of the list from which a node has been logically removed. One presently preferred representation of the deleted indication is as a deleted bit encoded as part of a sentinel node's pointer to the body of the linked list. For example,

```
typedef pointer {
    node *ptr;
    boolean deleted;
}
```

Figure 6:
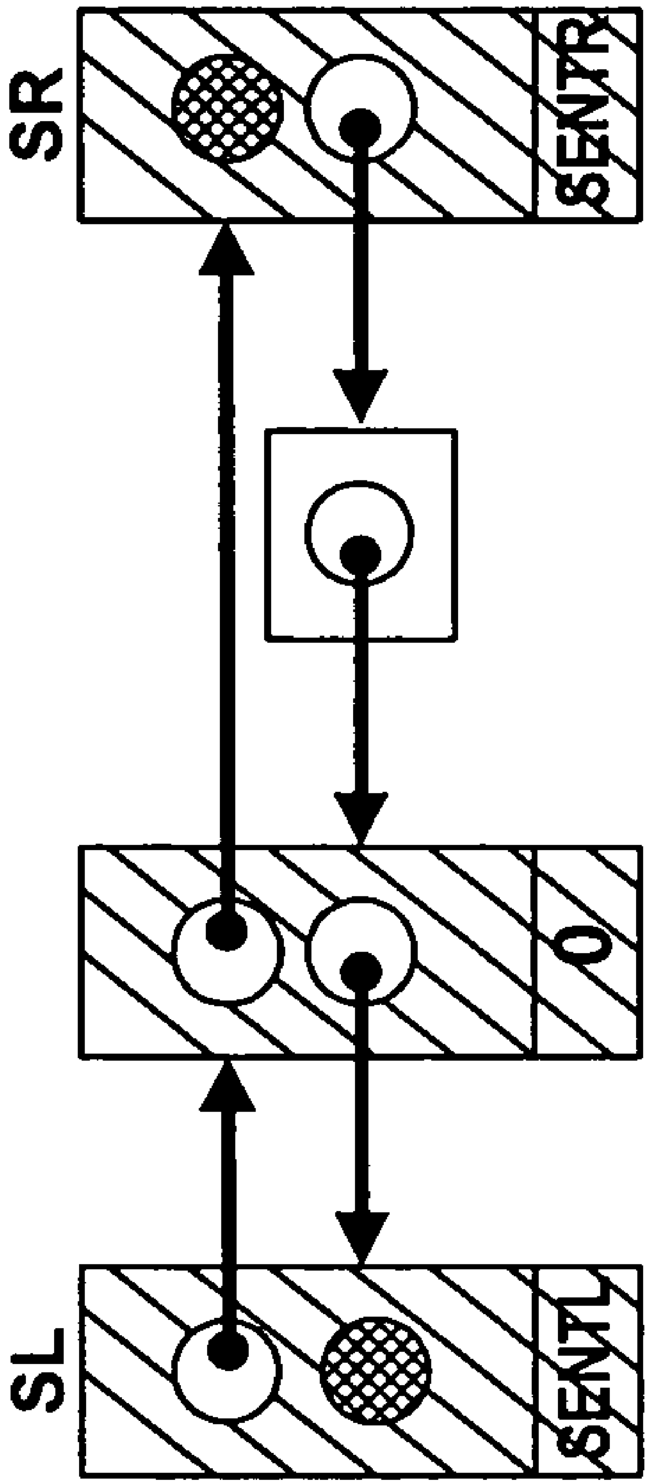
FIG. 6 depicts an alternative deleted node indication encoding technique employing a dummy node suitable for use in a linked-list-based implementation of a deque.

Assuming sufficient pointer alignment to free a low-order bit, the pointer structure may be represented as a single word, thereby facilitating atomic update of the sentinel node's pointer to the list body, the deleted bit, and a node value, all using a double-word compare and swap (DCAS) operation. Nonetheless, other encodings are also suitable. For example, the deleted indication may be separately encoded at the cost, in some implementations, of more complex synchronization (e.g., N-word compare-and-swap operations) or by introducing a special dummy type "delete-bit" node, distinguishable from the regular nodes described above. In one such configuration, illustrated in FIG. 6, each processor has a dummy node for the left and one for the right. Given such dummy nodes, an indirect reference to a list body node via a dummy node can be used to encode a true value of the deleted indication, whereas a direct reference can represent a false value. Particular deleted indications are implementation specific and any of a variety of encodings are suitable. However, for the sake of illustration and without loss of generality, a deleted bit encoding is assumed for the description that follows.

Figure 7A:
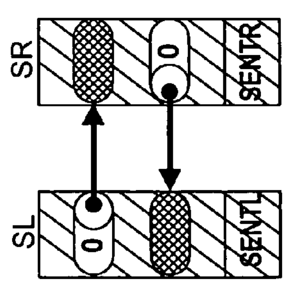
FIGS. 7A, 7B, 7C and 7D depict various empty states of a deque implemented as a doubly linked-list in accordance with an exemplary embodiment of the present invention.
Figure 7B:
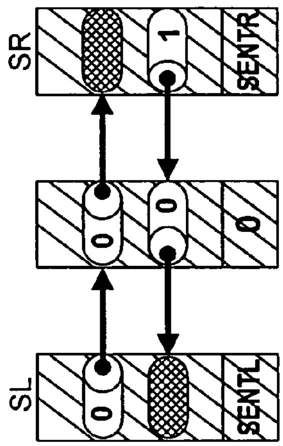
Figure 7C:
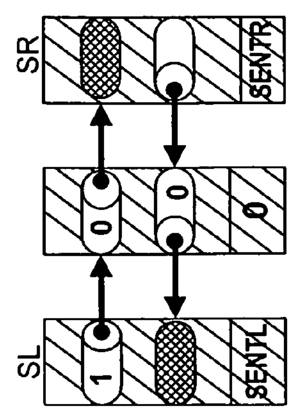
Figure 7D:
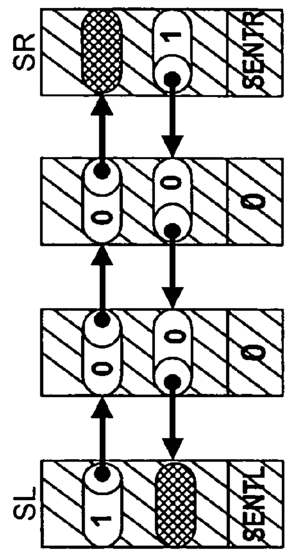

Operations on a linked-list encoded deque proceed as follows. An initial empty state of the deque is typically represented as illustrated in FIG. 7A, i.e., with SR->L==SL and SL->R==SR. However, as will become apparent from the description that follows, several other states of the linked list correspond to an empty deque, albeit represented as a list with one or two logically, but not yet physically, deleted nodes. FIGS. 7B, 7C and 7D illustrate these additional empty states with deleted bits encoded as part of corresponding sentinel node's pointers to a null value element of the linked list.

Push and pop operations are now described, each in turn. Both push and pop operations use an auxiliary delete operation, which is described last. Exemplary right hand code (e.g., pop_right, push_right, and delete_right) is described in substantial detail with the understanding that left-hand-side operations (e.g., pop_left,push_left, and delete_left) are symmetric. As before, use of directional signals (e.g., left and right) will be understood by persons of ordinary skill in the art to be somewhat arbitrary. Accordingly, many other notational conventions, such as top and bottom, first-end and second-end, etc., and implementations denominated therein are also suitable.

An illustrative pop_right access operation in accordance with the present invention follows:

```
val pop_right() {
    while (true) {
        oldL = SR->L;
        v = oldL.ptr->value;
```

-continued

```
        if (v == "SentL") return "empty";
        if (oldL.deleted == true)
            delete_right();
        else if (v == "null") {
            if (DCAS (&SR->L, &oldL.ptr->value,
                        oldL, v, oldL, v))
                return "empty";
        }
        else {
            newL.ptr = oldL.ptr;
            newL.deleted = true;
            if (DCAS(&SR->L, &oldL.ptr->value,
                        oldL, v, newL, "null"))
                return v;
        }
    }
}
```

To perform a pop_right, an executing processor first reads SR->L and the value (oldL. ptr->value) of the node identified thereby (lines 3–4, above). The processor then checks the identified node for a SentL distinguishing value (line 5). If present, the deque has the empty state illustrated in FIG. 7A and pop_right returns. If not, the processor checks whether the deleted bit of the right sentinel's L pointer is true. If so, then the processor invokes the delete_right operation to remove the null node on the right-hand side, and then retries the pop. If the deleted bit of the right sentinel's L pointer is false, then the processor checks whether the node to be popped encodes a "null" value (Line 8). If so, the deque could have the empty state illustrated in FIG. 7C or the initially read SR->L and v may not represent a valid instantaneous state. To test for the empty state, pop_right performs an atomic check, using a DCAS operation, for presence of both a "null" value in the node and a false deleted bit encoded in the pointer to that node from the right sentinel (Lines 9–11). If the DCAS is successful, the deque is in the empty state illustrated in FIG. 7C (i.e., a pop_left execution has successfully completed, but delete_left has not) and pop_right returns. Otherwise, the deque must have been modified between the original reads and the DCAS test, in which case pop_right loops and retries.

Figure 8A:
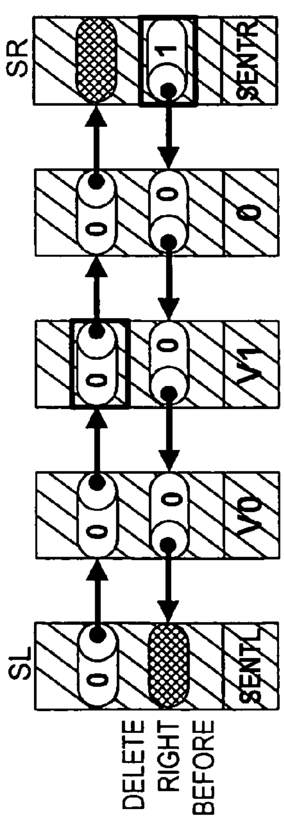
FIGS. 8A and 8C depict valid deque states before and after successful completion of a delete_right operation in accordance with an exemplary doubly linked-list embodiment of the present invention.
Figure 8B:
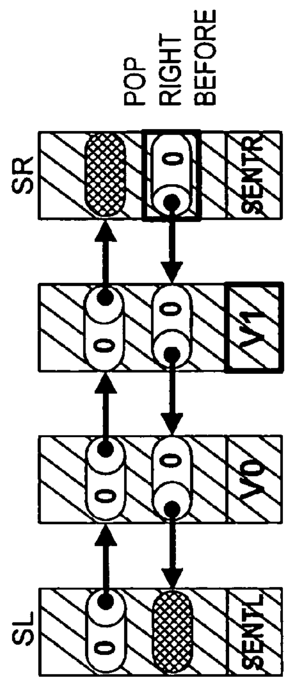
FIGS. 8B and 8D depict valid deque states before and after successful completion of a pop_right operation in accordance with an exemplary doubly linked-list embodiment of the present invention.
Figure 8C:
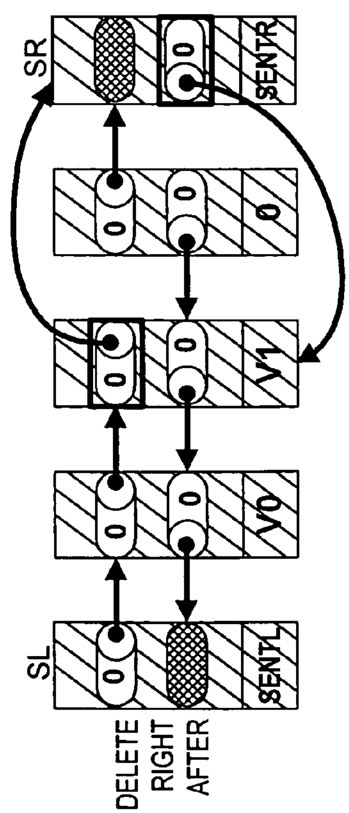
Figure 8D:
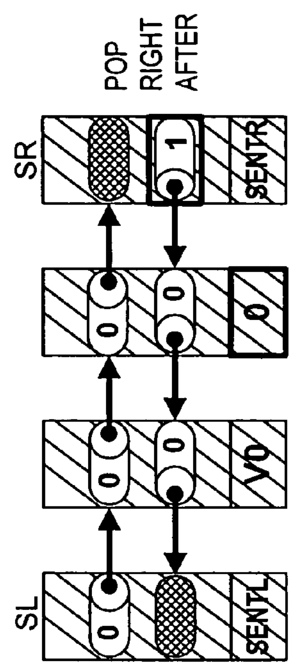

Finally, there is the case in which the deleted bit is false and v is not null, as in the deque state illustrated in FIG. 8B. Using a DCAS, pop_right atomically swaps v out from the node, changing its value to "null," while at the same time changing the deleted bit in the node identifying pointer of the right sentinel (SR->L) to true (Lines 14–17). If the DCAS fails, then either the left pointer of the right sentinel (SR->L) no longer points to the node for which a pop was attempted (such as if a competing concurrent push_right successfully completed between one of the original reads and the DCAS test) or the value of the identified node has been set to "null" (e.g., by successful completion of a competing concurrent pop_right or pop_left). In either case, pop_right loops back to retry. However, if the DCAS is successful (Line 18), pop_right returns v as the result of the pop, leaving the deque in a state, such as illustrated in FIG. 8D, wherein the right sentinel's deleted bit is true, indicating that the node has been logically deleted. Typically, the next pop_right or push_right will call the delete_right operation to perform the physical deletion. However, in some implementations, pop_right may invoke delete_right before returning.

An illustrative push_right access operation in accordance with the present invention follows:

```
val push_right (val v) {
    newL.ptr = new Node();
    if (newL.ptr == "null") return "full";
    newL.deleted = false;
    while (true) {
        oldL = SR->L;
        if (oldL.deleted == true)
            delete_right();
        else {
            newL.ptr->R.ptr = SR;
            newL.ptr->R.deleted = false;
            newL.ptr->L = oldL;
            newL->value = v;
            oldLR.ptr = SR;
            oldLR.deleted = false;
            if (DCAS(&SR->L, &SR->L.ptr->R,
                            oldL, oldLR, newL, newL))
                return "okay";
        }
    }
}
```

Figure 9A:
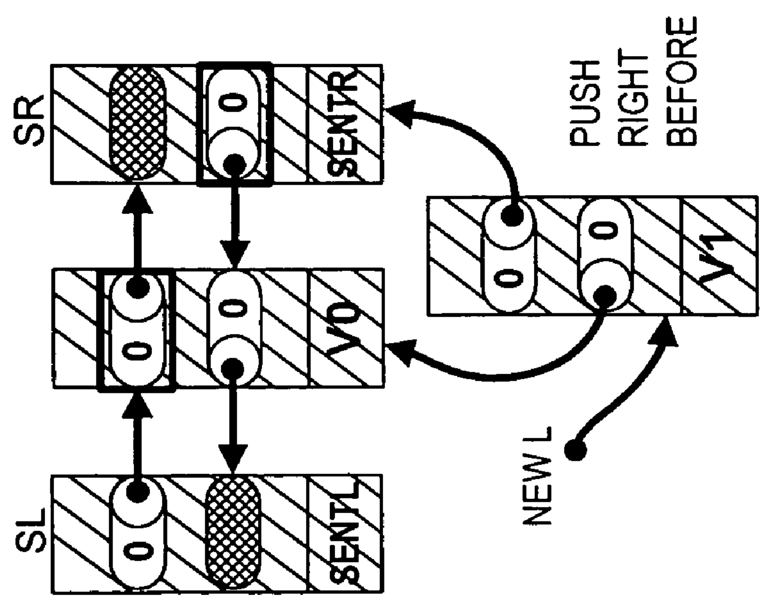
FIGS. 9A and 9B depict execution of a push_right access operation for a deque implemented as doubly linked-list in accordance with an exemplary embodiment of the present invention. In particular.
Figure 9B:
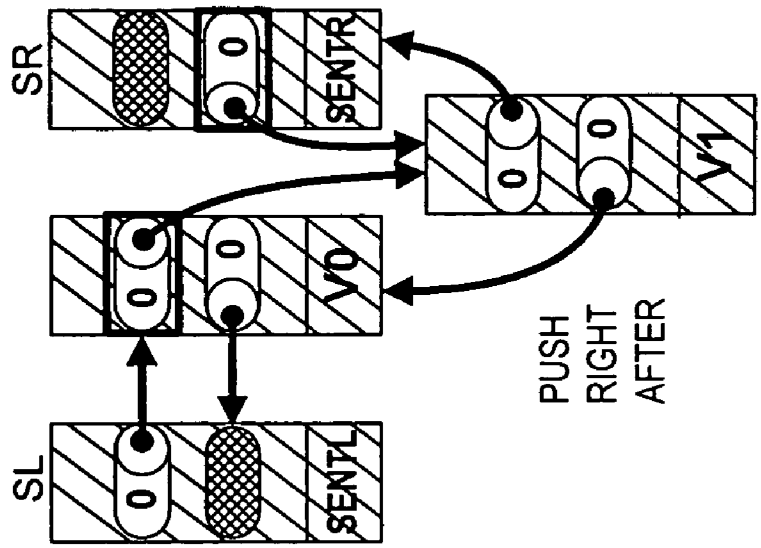

Execution of the push_right operation is now described with reference to FIGS. 9A and 9B and the above exemplary code. Push_right begins by obtaining and initializing a new node (lines 2–4). The operation then reads SR->L and checks if the deleted bit encoded in the right sentinel is true (lines 6–7). If so, push_right invokes delete_right to physically delete the null node to which the right sentinel's left pointer (SR->L) points and retries. If instead, the deleted bit is false, push_right initializes value and left and right pointers of the new node to splice the new node into the list between the right sentinel and its left neighbor (lines 10–13). Using a DCAS, push_right atomically updates the right sentinel's left pointer (SR->L) and the left neighbor's right pointer (SR->L.ptr->R). If the DCAS is successful, the splice is completed as illustrated in FIG. 9B. Otherwise, deque state has changed since SR->L was read in a way that affects the consistency of the pointers (e.g., due to successful completion of a competing concurrent push_right, pop_right or pop_left) in which case push_right loops back and retries.

An illustrative delete_right operation in accordance with the present invention follows:

```
delete_right() {
    while (true) {
        oldL = SR->L;
        if (oldL.deleted == false) return;
        oldLL = oldL.ptr->L.ptr;
        if (oldLL->value != "null") {
            oldLLR = oldLL->R;
            if (oldL.ptr == oldLLR.ptr) {
                newR.ptr = SR;
                newR.deleted = false;
                if (DCAS(&SR->L, &oldLL->R,
                                oldL, oldLLR, oldLL, newR))
                    return;
            }
        }
        else { /* there are two null items */
            oldR = SL->R;
            newL.ptr = SL;
            newL.deleted = false;
            newR.ptr = SR;
            newR.deleted = false;
            if (oldR.deleted)
                if (DCAS(&SR->L, &SL->R,
```

-continued

```
                                oldL, oldR, newL, newR))
                    return;
        }
    }
}
```

Execution of the delete_right operation is now described with reference to FIGS. 8A and 8C and the above exemplary code. Delete_right begins by checking that the left pointer in the right sentinel has its deleted bit set to true (line 4). Otherwise, delete_right returns.

If the deleted bit is true, the next step is to determine the state of the deque. In general, the deque state may be empty as illustrated in FIG. 7B or 7D or may include one or more non-null elements (e.g., as illustrated in FIG. 8A). To determine which, delete_right obtains a pointer (oldLL) to the node immediately left of the node to be deleted. Delete_right then checks the value in the node identified by the pointer oldLL (Line 6). In general, this node may (1) have a non-null value, (2) be the left sentinel, or (3) have a null value. In the first two cases, which correspond respectively to the states depicted in FIGS. 8A and 7B, the previously read right sentinel pointer (oldL. ptr) is compared against the right pointer of the node identified by oldLL (i.e., oldLLR. ptr). If the pointers are unequal, the deque has been modified such that delete_right pointer values are inconsistent and should be read again. Accordingly, delete_right loops and retries. If however, the pointers are equal, delete_right employs a DCAS to atomically swap pointers so that SR and oldLL point to each other, excising the null node from the list. FIG. 8C illustrates successful completion of a delete_right operation on the initial deque state illustrated in FIG. 8A.

The case of the null value is a bit different. A null value indicates that deque state is empty with two null elements as illustrated in FIG. 7D. To delete both null elements, delete_right checks oldR. deleted, the deleted bit encoded in the right pointer of the left sentinel, to see if the deleted bits in both sentinels are true (line 22). If so, delete_right attempts to point the sentinels to each other using a DCAS (lines 23–24). In case of failure, delete_right loops and retries until the deletion is completed.

Figure 10:
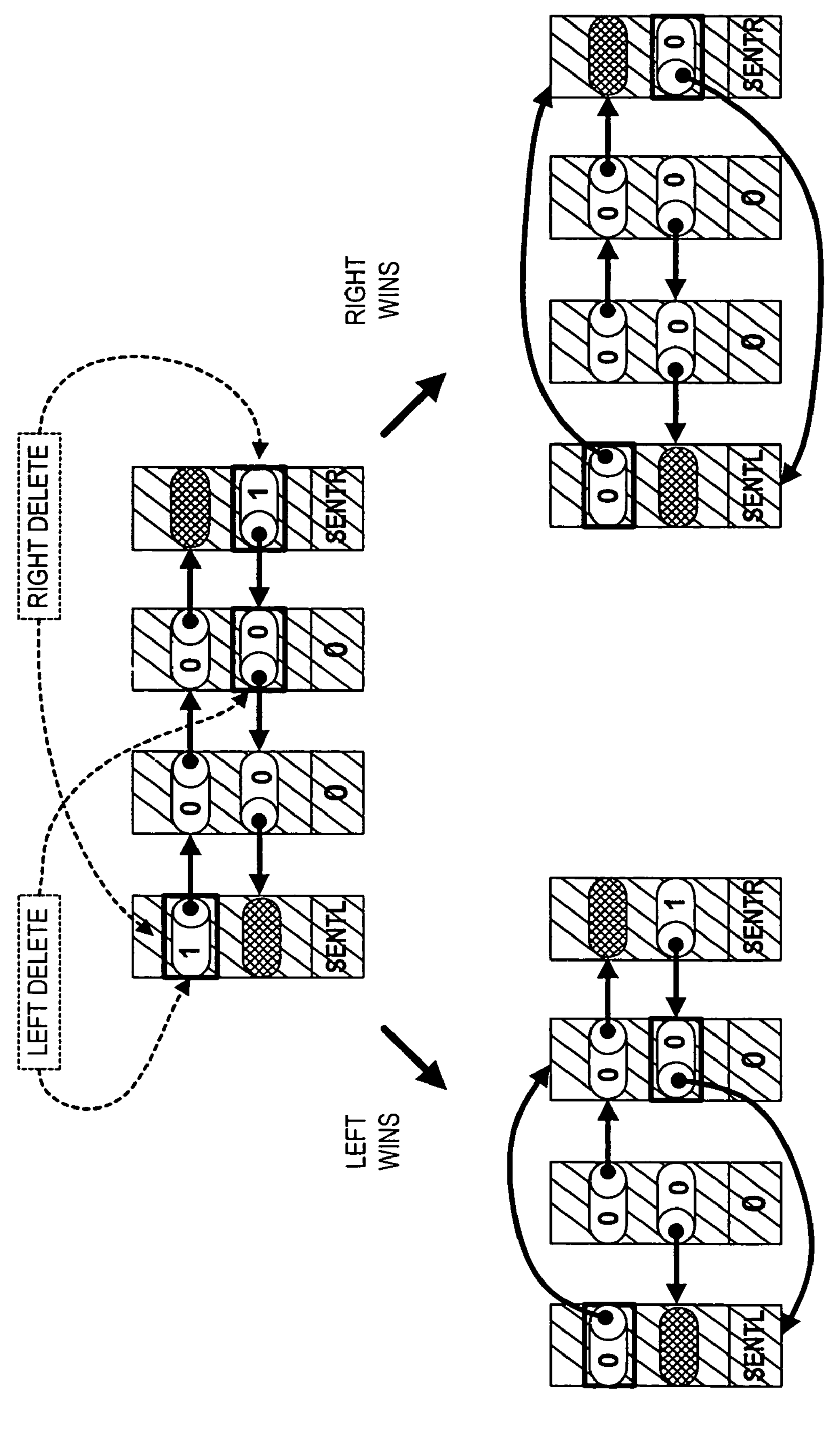
FIG. 10 illustrates two valid outcomes in an execution sequences wherein competing concurrent left_delete and right_delete operations operate on a empty deque state with two null elements.

The most interesting case occurs when there are two null nodes and a delete_left about to be executed from the left, concurrent with a delete_right about to be executed from the right. A variety of scenarios may develop depending on the order of operations. However, the scenario depicted in FIG. 10 is illustrative. In general, the deque states illustrated in FIG. 10 can occur if a delete_left (which is symmetric with delete_right) starts first, e.g., reading the value of the node immediately right of the node it is to delete (oldRR->value) while that value is still non-null, but just before a concurrent execution of pop_right sets the value to null. The delete_left (symmetrically as described above with reference to pop_right) attempts to delete a single null node using a DCAS to atomically update the left sentinel's right pointer and the right-most null node's left pointer. (Note that delete_left is unaware that the right most of the two null nodes has been popped and is in fact contains a null value.) Concurrently, the delete_right, which started later following the pop_right, detects the two empty nodes and attempts to delete both null nodes using a DCAS to atomically update the pointers of the left and right sentinels to point to the other. As illustrated in FIG. 10, the DCAS operations overlap on the pointer in the left sentinel and two outcomes are possible.

If delete_left executes its DCAS first, delete_left's attempted single node delete succeeds and delete_right's attempted double node delete fails. The deleted bit of the right sentinel remains true and a single null node remains for deletion by delete_right on its next pass. If instead, delete_right executes its DCAS first, delete_right's attempted double node delete succeeds, resulting in a deque state as illustrated in FIG. 7A. Delete_left's attempted single node delete fails. The deleted bits of both right and left sentinels are set to false and delete_left returns on its next pass based on the false state of the left sentinel's deleted bit.

Based on the above description of illustrative right-hand variants of push, pop and delete operations, persons of ordinary skill in the art will immediately appreciate operation of the left-hand variants. Indeed, Pop_left, push_left and delete_left sequences are symmetric to their above described right hand variants. An illustrative pop_left access operation in accordance with the present invention follows:

```
val pop__left() {
    while (true) {
        oldR = SL->R;
        v = oldR.ptr->value;
        if (v == "SentR") return "empty";
        if (oldR.deleted == true)
            delete__left();
        else if (v == "null") {
            if (DCAS(&SL->R, &oldR.ptr->value,
                        oldR, v, oldR, v))
                return "empty";
        }
        else {
            newR.ptr = oldR.ptr;
            newR.deleted = true;
            if (DCAS(&SL->R, &oldR.ptr->value,
                        oldR, v, newR, "null"))
                return v;
        }
    }
}
```

An illustrative push_left access operation in accordance with the present invention follows:

```
val push__left(val v) {
    newR.ptr = new Node();
    if (newR.ptr == "null") return "full";
    newR.deleted = false;
    while (true) {
        oldR = SL->R;
        if (oldR.deleted == true)
            delete__left();
        else {
            newR.ptr->L.ptr = SL;
            newR.ptr->L.deleted = false;
            newR.ptr->R = oldR;
            newR->value = v;
            oldRL.ptr = SL;
            oldRL.deleted = false;
            if (DCAS(&SL->R, &SL->R.ptr->L,
                        oldR, oldRL, newR, newR))
                return "okay";
        }
    }
}
```

An illustrative delete_left operation in accordance with the present invention follows:

```
delete__left() {
    while (true) {
        oldR = SL->R;
        if (oldR.deleted == false) return;
        oldRR = oldR.ptr->R.ptr;
        if (oldRR->value != "null") {
            oldRRL = oldRR->L;
            if (oldR.ptr == oldRRL.ptr) {
                newL.ptr = SL;
                newL.deleted = false;
                if (DCAS(&SL->R, &oldRR->L,
                            oldR, oldRRL, oldRR, newL))
                    return;
            }
        }
        else { /* there are two null items */
            oldL = SR->L;
            newR.ptr = SR;
            newR.deleted = false;
            newL.ptr = SL;
            newL.deleted = false;
            if (oldL.deleted)
                if (DCAS(&SR->L, &SL->R,
                            oldL, oldR, newL, newR))
                    return;
        }
    }
}
```

While the invention has been described with reference to various embodiments, it will be understood that these embodiments are illustrative and that the scope of the invention is not limited to them. Many variations, modifications, additions, and improvements are possible. Plural instances may be provided for components described herein as a single instance. Finally, boundaries between various components, operations and data stores are somewhat arbitrary, and particular operations are illustrated in the context of specific illustrative configurations. Other allocations of functionality are envisioned and may fall within the scope of claims that follow. Structures and functionality presented as discrete components in the exemplary configurations may be implemented as a combined structure or component. These and other variations, modifications, additions, and improvements may fall within the scope of the invention as defined in the claims that follow.

What is claimed is:

1. A concurrent shared object representation comprising:

a computer readable encoding for a sequence of zero or more values in a computer medium; and access operations defined for access to each of opposing ends of the sequence, wherein execution of any one of the access operations is non-blocking with respect to any other execution of the access operations throughout a complete range of valid states, including one or more boundary condition states, and wherein, at least for those of the valid states other than the one or more boundary condition states, opposing-end ones of the access operations are disjoint.

2. The concurrent shared object representation of claim 1, wherein the computer readable encoding includes an array of elements for representing the sequence; and wherein the one or more boundary condition states include a full state and an empty state.

3. The concurrent shared object representation of claim 2, wherein the array of elements is organized as a circular buffer of fixed size with opposing-end indices respectively identifying opposing ends of the sequence; and wherein concurrent non-blocking access is mediated, at least in part, by performing, during execution of each of the access operations, an atomic update of a respective one of the opposing-end indices and of an array element corresponding thereto.

4. The concurrent shared object representation of claim 1, wherein the computer readable encoding includes a linked-list of nodes representing the sequence; and wherein the one or more boundary condition states include one or more empty states.

5. The concurrent shared object representation of claim 4, wherein the access operations include push, pop and delete operations, and wherein concurrent access is mediated, at least in part, by performing, during execution of each of the pop operations, an atomic update of a list node and both a deleted node indication and list-end identifier corresponding thereto.

6. The concurrent shared object representation of claim 5, wherein concurrent access is further mediated, at least in part, by performing, during execution of each of the delete operations, an atomic update of a deleted node indication and at least one list-end identifier corresponding thereto.

7. The concurrent shared object representation of claim 4, wherein the linked-list of nodes is a doubly-linked list thereof.

8. The concurrent shared object representation of claim 1, wherein the access operations include push and pop operations.

9. The concurrent shared object representation of claim 8, wherein the access operations further include delete operations.

10. The concurrent shared object representation of claim 1, wherein the access operations include push and pop operations, including opposing end variants of each.

11. The concurrent shared object representation of claim 1, wherein the access operations include push and pop operations, including opposing end variants of at least one of the push and pop operations.

12. A method of managing access to a dynamically allocated list susceptible to concurrent operations on a sequence encoded therein, the method comprising:

executing as part of a pop operation, an atomic update of a list node and both a deleted node indication and list-end identifier corresponding thereto;

the deleted node indication marking the corresponding element for subsequent deletion from the list.

13. The method of claim 12, further comprising:

executing as part of a delete operation, an atomic update of a deleted node indication and at least one list-end identifier corresponding thereto.

14. The method of claim 13, wherein the list is a doubly-linked list susceptible to concurrent operation of opposing-end variants of the pop operation; and wherein the atomic update includes execution of a DCAS.

15. The method of claim 13, wherein the list is a doubly-linked list susceptible to concurrent operation of a same-end push operation; and wherein the atomic update includes execution of a DCAS.

16. The method of claim 12, further comprising:

responsive to the deleted node indication, excising a marked node from the list by atomically updating opposing direction pointers impinging thereon and the deleted node indication thereto.

17. The method of claim 12, further comprising:

deleting the marked element from the list at least before completion of a same-end push or pop operation.

18. The method of claim 12, further comprising:

wherein the deleted node indication is encoded integral with an end-node identifying pointer.

19. The method of claim 12, further comprising:

wherein the deleted node indication is encoded as a dummy node.

20. A computer program product encoded in at least one computer readable medium, the computer program product comprising:

at least one functional sequence providing non-blocking access to a concurrent shared object, the concurrent shared object instantiable as a linked-list delimited by a pair of end identifiers;

wherein instances of the at least one functional sequence are concurrently executable by plural processors of a multiprocessor and each include an atomic operation to atomically update one of the end identifiers and a node of the linked-list corresponding thereto, wherein for opposing end instances, the atomic updates are disjoint for at least all non-empty states of the concurrent shared object.

21. A computer program product as recited in claim 20, wherein the at least one functional sequence includes both push and pop functional sequences.

22. A computer program product as recited in claim 20, wherein the at least one computer readable medium is selected from the set comprising of: a disk, tape or other magnetic, optical, or electronic storage medium; or a network, wireline, wireless or other communications medium, transmitted or received at a computer.

23. An apparatus comprising:

plural processors;

a store addressable by each of the plural processors;

first- and second-end identifier stores accessible to each of the plural processors for identifying opposing ends of a concurrent shared object in the addressable store; and means for coordinating competing pop operations, the coordinating means employing in each instance of the pop operations, an atomic operation to disambiguate a retry state and a boundary condition state of the concurrent shared object based on then-current contents of one, but not both, of the first- and second-end identifier stores and an element of the concurrent shared object corresponding thereto.

* * * * *

UNITED STATES PATENT AND TRADEMARK OFFICE

CERTIFICATE OF CORRECTION

PATENT NO. : 7,000,234 B1
APPLICATION NO. : 09/547290
DATED : February 14, 2006
INVENTOR(S) : Nir N. Shavit, Paul A. Martin and Guy L. Steele Jr.

It is certified that error appears in the above-identified patent and that said Letters Patent is hereby corrected as shown below:

Title Page, Paragraph (74), please add at end of firm title ---LLP---

References Cited:

Page 2, Col. 2, line 20, please replace “Reseach” with ---Research---
Page 2, Col. 2, line 31, please replace “evaluatio” with ---evaluation---
Page 2, Col. 2, line 38, please replace “N. Shavit and Touitou.” with ---N. Shavit and D. Touitou.---
Page 2, Col. 2, line 39, please replace “Distriubted” with ---Distributed---

Col. 7, line 12, please replace “$0 \leq |s| \leq$ length_S” with ---$0 \leq |S| \leq$ length_S---
Col. 7, line 25, please replace “$S=(v_0,..., v_k)$” with ---$S = \langle v_0, ..., v_{k-1} \rangle$---
Col. 7, line 34, please replace “pop_right changes” with ---pop_right() changes---
Col. 8, line 54, please replace “short hand” with ---shorthand---

Signed and Sealed this

Eighth Day of August, 2006

JON W. DUDAS
*Director of the United States Patent and Trademark Office*